United States Patent [19]

Kishi et al.

[11] Patent Number: 4,755,926
[45] Date of Patent: Jul. 5, 1988

[54] METHOD AND APPARATUS FOR PRODUCING A THREE-DIMENSIONAL CURVED SURFACE FROM TWO-DIMENSIONAL CURVES IN PERPENDICULAR PLANES

[75] Inventors: Hajimu Kishi; Masaki Seki, both of Tokyo, Japan

[73] Assignee: Fanuc Ltd., Minamitsuru, Japan

[21] Appl. No.: 711,578

[22] PCT Filed: Jul. 7, 1984

[86] PCT No.: PCT/JP84/00347
§ 371 Date: Mar. 6, 1985
§ 102(e) Date: Mar. 6, 1985

[87] PCT Pub. No.: WO85/00442
PCT Pub. Date: Jan. 31, 1985

[30] Foreign Application Priority Data

Jul. 7, 1983 [JP] Japan .................................. 58-123599

[51] Int. Cl.[4] ........................ G06F 15/46; G05B 19/18
[52] U.S. Cl. .................................... 364/191; 364/474; 318/568
[58] Field of Search ................ 364/167–169, 364/191, 194, 520–522, 200 MS File, 900 MS File, 474; 318/567–570, 574

[56] References Cited

U.S. PATENT DOCUMENTS

| 4,150,329 | 4/1979 | Dahlstrom | 318/574 |
| 4,393,450 | 7/1983 | Jerard | 364/520 X |
| 4,491,906 | 1/1985 | Kishi et al. | 364/191 |
| 4,507,738 | 3/1985 | Nozawa et al. | 364/474 |
| 4,523,270 | 6/1985 | Kishi et al. | 364/191 |
| 4,569,014 | 2/1986 | Kishi et al. | 364/191 |

Primary Examiner—Gary V. Harkcom
Attorney, Agent, or Firm—Staas & Halsey

[57] ABSTRACT

A method and apparatus for specifying a three-dimensional curve having steps of entering data specifying a first projection curve ($CV_1$) and a second projection curve ($CV_2$) is obtained when a three-dimensional curve (31a) is projected onto two adjacent planes (e.g., an XY plane and a YZ plane) in a rectangular coordinate system. The method also includes finding coordinate values ($a_i$, $b_i$) of an i-th ($i=1, 2 \ldots$) partition point $P_i$ from among partition points partitioning the first projection curve ($CV_1$) into a number of line segments and finding coordinate values ($b_i, c_i$) of a point $Q_i$ on the second projection curve ($CV_2$) having a coordinate value $b_i$ on a common axis (Y axis) among coordinate axes of the two adjacent planes. The three-dimensional curve (31a) is specified by a collection of points ($R_i$) having the three-dimensional coordinate values ($a_i$, $b_i$, $c_i$).

7 Claims, 4 Drawing Sheets

METHOD AND APPARATUS FOR PRODUCING A THREE-DIMENSIONAL CURVED SURFACE FROM TWO-DIMENSIONAL CURVES IN PERPENDICULAR PLANES

CROSS REFERENCE TO RELATED APPLICATION

This application is related to pending U.S. application Ser. No. 711,579.

BACKGROUND OF THE INVENTION

This invention relates to a method of specifying a three-dimensional curve and, more particularly, to a method of specifying a three-dimensional curve that is ideal for the creation of an NC tape required for the numerically controlled machining of a three-dimensional metal mold or the like.

A curved surface of a three-dimensional metal mold or the like on a design drawing is generally expressed by a plurality of section curves, but no profile data is shown for the shape of the area lying between a certain section curve and the next adjacent section curve. In numerically controlled machining it is essential that machining be carried out so as to smoothly connect these two section curves despite the fact that the profile between them is not given. In other words, this means that machining must be performed by generating the curved surface between the two section curves from such data as that indicative of the section curves, recording on an NC tape the data concerning the generated curved surface, and carrying out machining in accordance with commands from the NC tape. To this end, the applicant has proposed in U.S. Ser. No. 266,284 now U.S. Pat. Nos. 4,491,906 and 4,569,014 (see Japanese Patent Application No. 55-78247), and has put into practice, a method of creating curved surfaces, comprising generating a plurality of intermediate sections and finding a section curve (intermediate section curve) on a curved body, based on the intermediate sections, in accordance with predetermined rules, from section data specifying given sections of a three-dimensional curved body and from data specifying section curves in said sections, and generating the curved surface of the three-dimensional body based on the plurality of generated intermediate section curves. This prior-art method will be described with reference to FIG. 1. The method includes giving section curves 11a, 12a in two sections 11, 12 and a reference curve 21a in a reference section 21, moving the first section curve 11a of the two given section curves 11a, 12a along the reference curve 21a while the curve is being transformed so as to be superposed on the second section curve 12a, and creating a curved surface, which is formed owing to said movement, as an assemblage of a plurality of intermediate section curves. In generating the intermediate section curves, the first and second section curves 11a, 12a are brought into uniform correspondence with each other in their entirety. Specifically, when each of the section curves is partitioned into M segments, i-th (i=1, 2, ... ) partition points $P_i$, $Q_i$ of the respective curves are made to correspond to each other and each of the intermediate sections curves is generated by using the corresponding relation.

However, since the prior-art method is adapted to generate a curved surface by giving the reference curve 21a in the reference section (a plane), curved surface generation cannot be performed in a case where a reference curve 31a is a three-dimensional curve, as shown in FIG. 2. In FIG. 2, numerals 11, 12 denote sections, 11a, 12a section curves, 41 an intermediate section, and 41a an intermediate section curve.

SUMMARY OF THE INVENTION

Accordingly, an object of the present invention is to provide a three-dimensional curve specifying method whereby a three-dimensional curve can be specified in a simple manner, and which is well-suited for application to curved surface generation in cases where a reference curve is a three-dimensional curve.

Disclosed is a three-dimensional curve specifying method which includes entering data specifying first and second curves obtained by projecting a three-dimensional curve onto two adjacent planes (e.g., an XY plane and a YZ plane) in a rectangular coordinate system, partitioning the first curve into a number of line segments and finding coordinate values $(a_i, b_i)$ of an i-th (i=1, 2, ... ) partition point $P_i$, finding coordinate values $(b_i, c_i)$ of a point $Q_i$ on the second curve having a coordinate value $b_i$ on a common axis (Y axis) from among the coordinate axes of the two adjacent planes, and specifying the aforementioned three-dimensional curve 31a by three-dimensional coordinate values $(a_i, b_i, c_i)$ (i=1, 2, ... ).

DESCRIPTION OF PREFERRED EMBODIMENT

Figure 1:
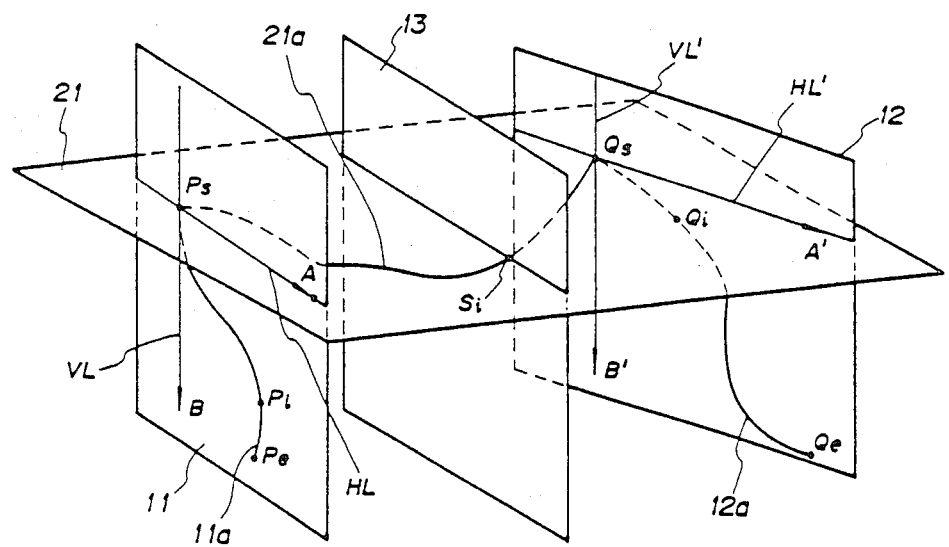
FIG. 1 is a view for describing the conventional method.
Figure 2:
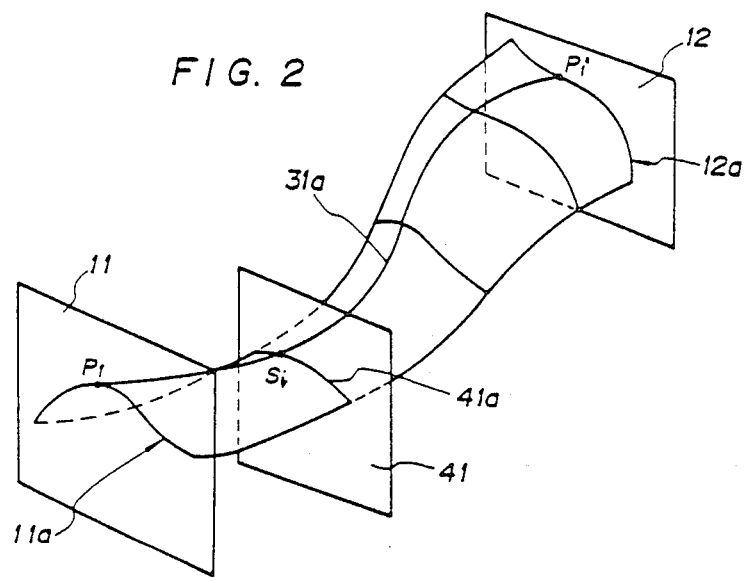
FIG. 2 shows an example of a three-dimensional curved surface and is useful in describing a drawback of the conventional method.
Figure 3:
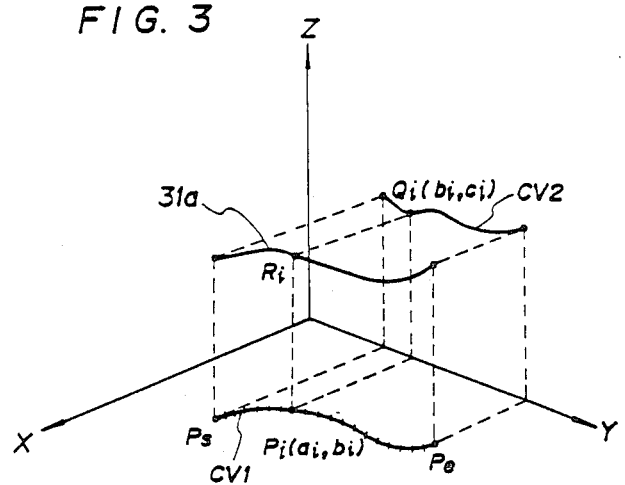
FIG. 3 is a view for describing the outline of the present invention.

Processing for specifying a three-dimensional curve according to the present invention is broadly classified into the following processes (a)–(d), with reference being had to FIG. 3:

(a) input processing for projecting the three-dimensional curve 31a onto two mutually adjacent planes (e.g., an X-Y plane and a Y-Z plane) in a rectangular coordinate system, and for entering a first curve $CV_1$ and a second curve $CV_2$ comprising the projections, each of the curves being approximated by straight lines and circular arcs;

(b) partition point processing for successively partitioning the first curve $CV_1$ from a starting point $P_s$ to an end point $P_e$ by a separately entered partitioning pitch, and for finding coordinate values $(a_i, b_i)$ of each partition point $P_i$;

(c) processing for finding coordinate values $(b_i, c_i)$ of a point $Q_i$ on the second curve $CV_2$ having a partition point coordinate value $b_i$ on a common axis (Y axis) from among the coordinate axes of the two adjacent planes; and (d) processing for storing a point $R_i(a_i,b_i,c_i)$ (i=1, 2, 3, ...) on the three-dimensional curve 31a to specify the three-dimensional curve.

Figure 4:
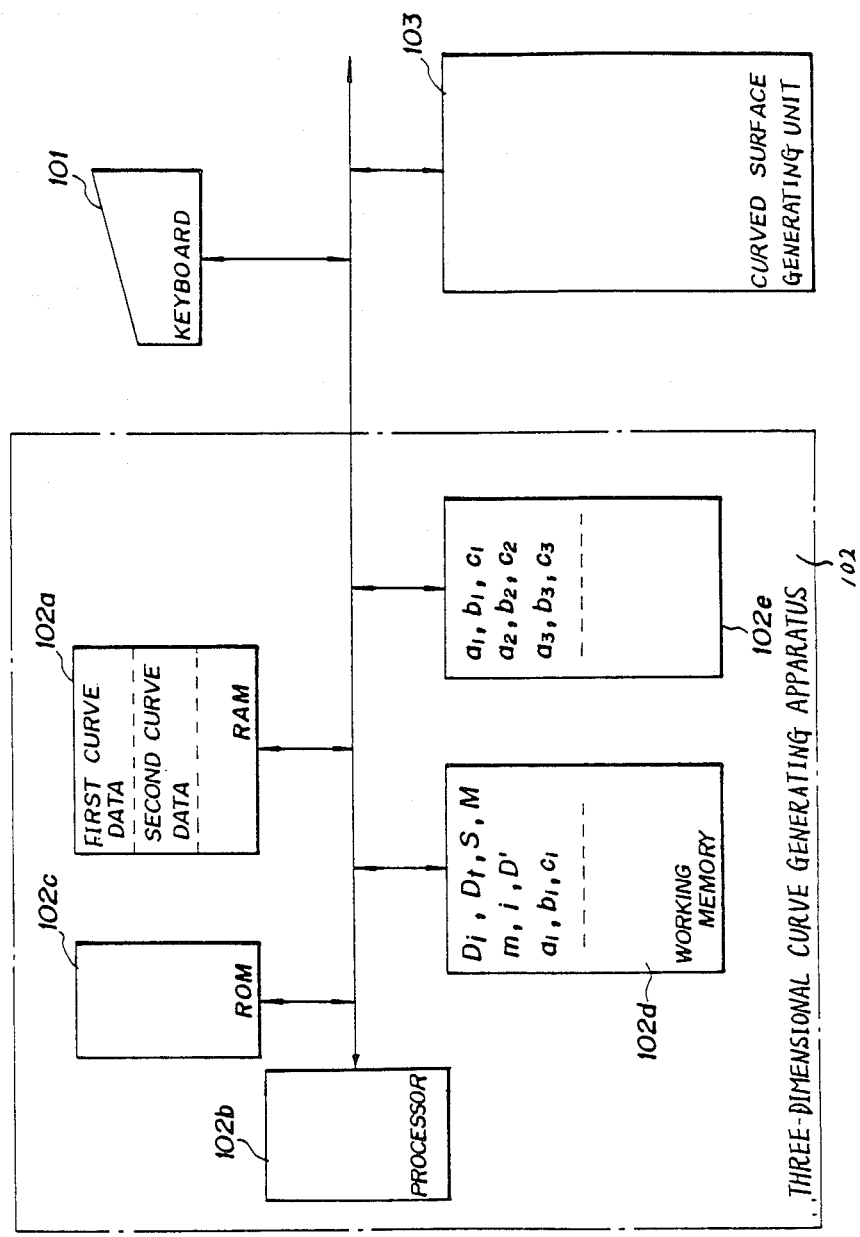
FIG. 4 is a block diagram of a three-dimensional curve generating apparatus for practicing the method of the present invention.
Figure 5:
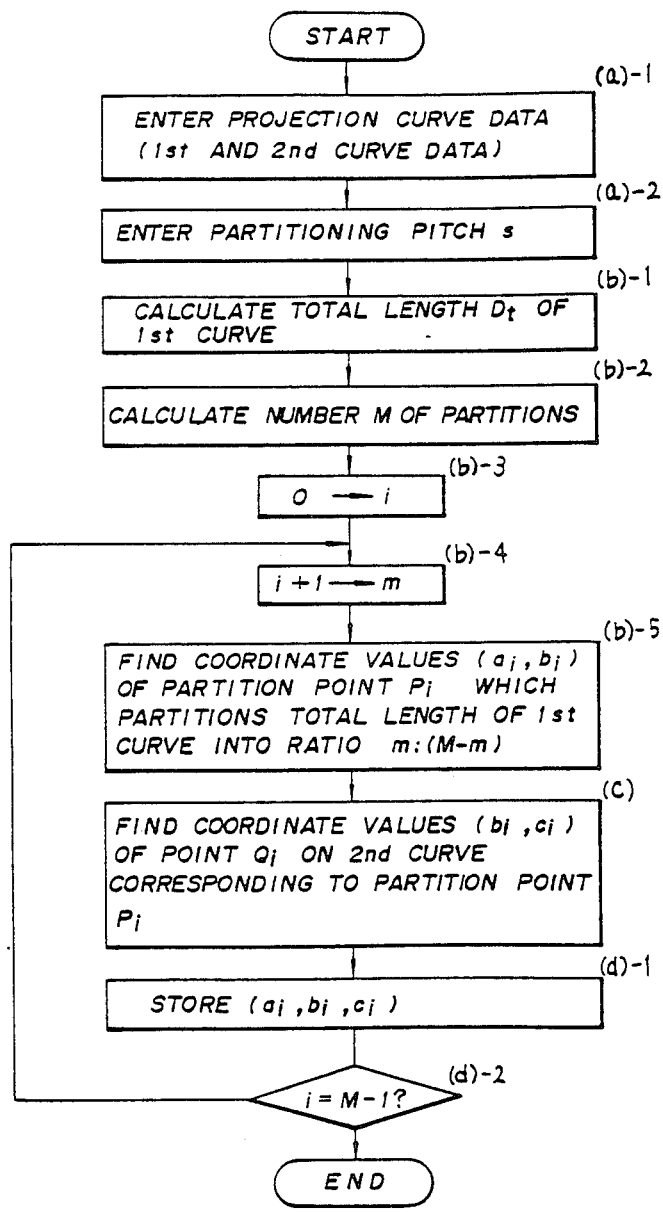
FIG. 5 is a flowchart of processing for generating a three-dimensional curve according to the present invention.

Each of the foregoing process steps will now be described in conjunction with FIG. 3, a block diagram of a three-dimensional curve creating apparatus shown in FIG. 4, and a processing flowchart shown in FIG. 5. In FIG. 4, numeral 101 denotes a keyboard, 102 a three-dimensional curve generating apparatus, and 103 a curved surface generating unit which receives created three-dimensional curve data as an input. The three-dimensional curve generating apparatus 102 includes a RAM 102a, processor 102b, a ROM 102c, a working memory 102d, and a data memory 102e for storing three-dimensional curve data.

Figure 6:
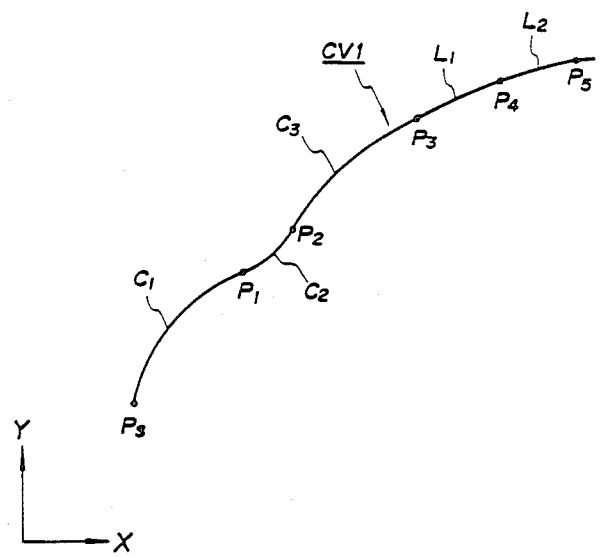
FIG. 6 is a view for describing a method of specifying a curve in a plane.

(a) Projection curve data input processing (a)-1 As shown in FIG. 6, assume that the first curve $CV_1$ obtained by the projection onto the X-Y plane is composed of circular arcs $C_1$, $C_2$, $C_3$, straight lines $L_1$, $L_2$ ... successively connected one to the next, that the starting and end points of each of the circular arcs $C_1$, $C_2$, $C_3$ are $(P_s, P_1)$, $(P_1, P_2)$, $(P_2, P_3)$, respectively, and that the end points of the straight lines $L_1$, $L_2$ are $P_4$, $P_5$ ..., and so on. In such case, the following data are fed into the three-dimensional curve generating apparatus 102 from the keyboard 101 and stored in the RAM 102a to specify the first curve $CV_1$:

$CV_1 = *$ $P_s(x_s,y_s);$ $C_1(r_1,x_{c1},y_{c1})\ P_1(x_1,y_1);$ $C_2(r_2,x_{c2},y_{c2})\ P_2(x_2,y_2);$ $C_3(r_3,x_{c3},y_{c3})\ P_3(x_3,y_3);$ $L_1, P_4(x_4,y_4);$ $L_2, P_5(x_5,y_5);$

...

It should be noted that $r_i$ (i=1, 2, 3) denotes the arc radius of each circular arc, $(x_{ci}, y_{ci})$ (i=1, 2, 3) represent the coordinate values of the arc center of each circular arc, and $(x_i,y_i)$ (i=1, 2, 3) designate the positional coordinate values of the point $P_i$.

The second curve $CV_2$ obtained by the projection on the YZ plane is similarly entered from the keyboard 101 upon being approximated by circular arcs and straight lines. Such will complete processing for entry of the projection curve data. Note that the block in the flowchart corresponding to the above process is marked at its upper right-hand corner by the symbols (a)-1. The same will hold for the other blocks as well.

(a)-2 A partitioning pitch s is entered from the keyboard 101 following entry of the first and second curve data.

(b) Partition point processing (b)-1 When the first and second curve data and the partitioning pitch have been entered, the processor 102b, on the basis of a control program stored in the ROM 102c, finds the length $D_i$ of each element of the first curve $CV_1$ (where the line segments $L_1, L_2, ...$ and circular arcs $C_1, C_2, C_3$ ... constructing the first curve are assumed to be the elements), calculates the total of these lengths and stores the total length $D_t$ of the first curve in the working memory 102d.

(b)-2 Thereafter, a number M of partitions is found from the length $D_t$ and partitioning pitch s by using the following equation:

$$D_t/s \rightarrow M \qquad (1)$$

It should be noted that M is an integer obtained by raising $D_t/s$ from the decimal point onward to arrive at the next higher whole number.

(b)-3 The processor 102b then performs the operation $0 \rightarrow i$ to initialize i. Note that the maximum value of i is (M-1).

(b)-4 The processor also finds m, n in accordance with the following expressions:

$i+1 \rightarrow m,\ M-m \rightarrow n$ (b)-5 Next, the processor 102b obtains the coordinate values $(a_i,b_i)$ of the partition point $P_i$ which partitions the first curve into the ratio m:n. Specifically, the processor first calculates a length D' from the starting point $P_s$ to the partition point $P_i$ which partitions the first curve $CV_1$ into the ratio m:n, the calculation being performed in accordance with the following equation:

$$\begin{aligned} D' &= m \cdot D_t/(m + n) \\ &= (i + 1) \cdot D_t/M \end{aligned} \qquad (2)$$

Next, an element which includes a position distanced by the length D' from the starting point Ps is extracted. To extract this element, let $D_1$ be the length of the initial element, $D_2$ the length of the next element, and so on through $D_3, ..., D_i, ...$ in like fashion. The element may then be extracted by finding k in the following expression:

$$\sum_{i=1}^{k-1} D_i \leq D' \leq \sum_{i=1}^{k} D_i \qquad (3)$$

When the k-th element has been found, the processor finds the coordinate values $(a_i,b_i)$ of the point $P_i$ on the k-th element whose distance from the starting point thereof is D'', where D'' is found from:

$$D'' = D' - \sum_{i=1}^{k-1} D_i \qquad (4)$$

The obtained point is that which partitions the given curve into the ratio m:n from one end thereof. It will be assumed that $$\sum_{i=1}^{k-1} D_i = 0$$

when $k = 1$.

(c) Processing for calculating of coordinate values of $Q_i$

The process is as follows for calculating the coordinate values $(b_i,c_i)$ of the point $Q_i$ on the second curve $CV_2$ corresponding to the partition point $P_i$ on the first curve $CV_1$.

Of the coordinate values $(a_i,b_i)$ of the partition point $P_i$, we assume that $b_i$ is the coordinate value on the Y axis, which is the common axis. We then find an element which constitutes the second curve $CV_2$ and which includes a point the Y-axis coordinate value whereof is $b_i$.

Letting a function specifying the element found in this manner be expressed by the following:

$$f(y, z) = 0 \qquad (5)$$

we substitute $b_i$ for y and find the Z-axis coordinate value z from the following:

$$f(b_i, z) = 0$$

Letting the Z-axis coordinate value obtained be $c_i$, $(b_i,c_i)$ will be the coordinate values of the point $Q_i$ on the second curve and corresponding to the partition point $P_i$.

(d) Processing for specifying three-dimensional curve (d)-1 $(a_i,b_i,c_i)$ obtained in step (c) are stored in the data memory 102e as coordinate values of the point $R_i$ on the three-dimensional curve.

(d)-2 The processor 102b then checks whether $i = (M-1)$ holds. If it does not, processing from step (b)-4 onward is repeated. If $i = (m-1)$ does hold, however, then processing for specifying the three-dimensional curve ends. It should be noted that a three-dimensional curve can be specified with greater precision if the partitioning pitch s is reduced to increase the number of partition points. When the position data $(a_i,b_i,c_i)$ indicative of point $R_i$ and stored in the data memory 102e are transferred to the curved surface generating unit 103, the latter executes curved surface generation processing.

As described hereinabove, the present invention includes entering data specifying first and second curves obtained by projecting a three-dimensional curve onto two adjacent planes in a rectangular coordinate system, partitioning the first curve into a number of line segments and finding coordinate values $(a_i,b_i)$ of an i-th (i=1, 2, 3 . . . ) partition point $P_i$, finding coordinate values $(b_i,c_i)$ of a point on the second curve having a coordinate value $b_i$ on a common axis among the coordinate axes of the two adjacent planes, and specifying the three-dimensional curve by three-dimensional coordinate values $(a_i, b_i, c_i)$ (i=1, 2, 3 . . . ). This makes it possible to specify a three-dimensional curve in a simple manner as well as a three-dimensional curved surface in which the three-dimensional curve serves as a reference curve.

The method of specifying a three dimensional curve according to the present invention is advantageous when used in specifying a three-dimensional free curved surface and is therefore well-suited for application in the creation of an NC tape for machining a three-dimensional curved body.

The invention claimed is:

1. A method of specifying and machining a three-dimensional curve on a workpiece using a curve generating apparatus, the method comprising:

entering, into the apparatus, data specifying first and second curves obtained by projecting and decomposing a three-dimensional curve onto two adjacent perpendicular intersecting planes in a rectangular coordinate system by approximating the projected curves as straight lines and circular arc segments, finding coordinate values $(a_i,b_i)$ of each i-th (i=1, 2 . . . ) partition point $P_i$ from among a plurality of partition points partitioning the first curve into a number of line segments using a ratio of first curve line lengths on each side of the partitioning point, finding respective coordinate values $(b_i,c_i)$ of a point $Q_i$ on the second curve having a coordinate value $b_i$ on a common axis among coordinate axes of said planes, specifying the three-dimensional curve by the three-dimensional coordinate values $(a_i, b_i, c_i)$ (i=1, 2, . . . ), and machining the workpiece in dependence on the three-dimensional curve.

2. A method of specifying a three-dimensional curve according to claim 1, comprising approximately specifying said first and second curves in terms of straight line segments and circular arcs.

3. A method of specifying a three-dimensional curve according to claim 2, comprising entering a partitioning pitch s for determining the separation of said partition points along said first curve, finding a total length $D_t$ of said first curve, and calculating the integral number M of partitions for said plurality of partition points from $D_t/s$.

4. A method of specifying a three-dimensional curve according to claim 3, comprising taking as each i-th partition point a point which partitions the total length of the first curve into a ratio m:n (where m=i+1, n=M-m).

5. A method of specifying a three-dimensional curve according to claim 1, wherein said two adjacent planes are an X-Y plane and a Y-Z plane, the first curve is a curve obtained by projecting the three-dimensional curve onto the X-Y plane, and the second curve is a curve obtained by projecting the three-dimensional curve onto the Y-Z plane.

6. A method of specifying a three-dimensional curve according to claim 1, comprising finding an element of the second curve having a coordinate value $b_i$, where it is assumed that the coordinate value on the axis common to the two planes is $b_i$ of the coordinate values $(a_i,b_i)$ of the respective partition point $P_i$, obtaining a function specifying said element, and finding a coordinate value of said point $Q_i$ on said second curve upon substituting $b_i$ into said function.

7. An apparatus for specifying and machining a three-dimensional curve on a workpiece, comprising:

means for entering data specifying first and second curves obtained by projecting and decomposing a three-dimensional curve onto two adjacent perpendicular intersecting planes in a rectangular coordinate system by approximating the projected curves as straight lines and circular arc segments, means for finding coordinate values $(a_i,b_i)$ of each i-th (i=1, 2 . . . ) partition point $P_i$ from among a plurality of partition points partitioning the first curve into a number of line segments using a ratio of first curve line lengths on each side of the partitioning point $P_1$, means for finding respective coordinate values $(b_i,c_i)$ of a point $Q_i$ on the second curve having a coordinate value $b_i$ on a common axis among coordinate axes of said planes, means for specifying the three-dimensional curve by the three-dimensional coordinate values $(a_i, b_i, c_i)$ (i=1, 2 . . . ), and machining the workpiece in dependence on the three-dimensional curve.

* * * * *